United States Patent
Lee et al.

(10) Patent No.: US 10,274,050 B2
(45) Date of Patent: Apr. 30, 2019

(54) TRANSMISSION FOR HYBRID VEHICLE

(71) Applicant: Hyundai Motor Company, Seoul (KR)

(72) Inventors: Keun Seok Lee, Hwaseong-si (KR); Kum Lim Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 253 days.

(21) Appl. No.: 14/851,260

(22) Filed: Sep. 11, 2015

(65) Prior Publication Data
US 2016/0129785 A1    May 12, 2016

(30) Foreign Application Priority Data

Nov. 12, 2014 (KR) .................. 10-2014-0157364

(51) Int. Cl.
*B60K 6/54* (2007.10)
*F16H 3/00* (2006.01)
*F16H 3/093* (2006.01)

(52) U.S. Cl.
CPC ........ *F16H 3/006* (2013.01); *B60K 2006/541* (2013.01); *B60Y 2400/79* (2013.01); *F16H 2003/0931* (2013.01); *F16H 2200/0052* (2013.01)

(58) Field of Classification Search
CPC ............ F16H 3/006; F16H 2003/0931; B60K 2006/541; B60K 6/547
USPC .................................. 74/330, 331
See application file for complete search history.

(56) References Cited

U.S. PATENT DOCUMENTS

| | | | |
|---|---|---|---|
| 8,931,371 B2* | 1/2015 | Xie | B60K 6/48 74/665 A |
| 9,145,952 B2 | 9/2015 | Lee et al. | |
| 9,341,239 B2* | 5/2016 | Lee | F16H 3/08 |
| 9,849,771 B2* | 12/2017 | Zhang | B60K 6/40 |
| 9,889,733 B2* | 2/2018 | Yang | B60K 6/36 |
| 9,889,734 B2* | 2/2018 | Yang | B60K 6/40 |
| 2002/0033059 A1 | 3/2002 | Pels et al. | |
| 2005/0139035 A1 | 6/2005 | Lee et al. | |
| 2007/0028718 A1 | 2/2007 | Lee et al. | |
| 2010/0154573 A1* | 6/2010 | Jackson | F16H 3/006 74/331 |
| 2011/0218716 A1* | 9/2011 | Olsson | F16H 3/006 701/51 |

(Continued)

FOREIGN PATENT DOCUMENTS

| | | |
|---|---|---|
| CN | 1637327 A | 7/2005 |
| CN | 1886280 A | 12/2006 |
| CN | 103507617 A | 1/2014 |

(Continued)

OTHER PUBLICATIONS

Chinese Office Action dated Oct. 16, 2018 for Chinese Application No. 201510622827.0.

*Primary Examiner* — William C Joyce
(74) *Attorney, Agent, or Firm* — Morgan, Lewis & Bockius LLP (57) ABSTRACT

A transmission for a hybrid vehicle may include an input shaft configured to receive power from an engine, a motor configured to receive power from a battery so as to generate the power by a regeneration, an output shaft configured to receive the power from the input shaft and the motor, and an idle shaft configured to connect the output shaft and the motor so as to receive driving force from the motor or transfer regenerative force to the motor.

8 Claims, 11 Drawing Sheets

(56) References Cited

U.S. PATENT DOCUMENTS

2013/0345008 A1    12/2013   Torrelli
2014/0157923 A1    6/2014   Lee et al.

FOREIGN PATENT DOCUMENTS

| | | |
|---|---|---|
| JP | 2002-89594 A | 3/2002 |
| JP | 2010-162923 A | 7/2010 |
| JP | 2010-162924 A | 7/2010 |
| JP | 2010-195378 A | 9/2010 |
| JP | 2010-203605 A | 9/2010 |
| KR | 10-2005-0048280 A | 5/2005 |
| KR | 10-2005-0064953 A | 6/2005 |
| KR | 10-1362059 B1 | 2/2014 |
| KR | 10-1459483 B1 | 11/2014 |
| KR | 10-2016-0038122 A | 4/2016 |

\* cited by examiner

TRANSMISSION FOR HYBRID VEHICLE

CROSS-REFERENCE TO RELATED APPLICATION

The present application claims priority to Korean Patent Application No. 10-2014-0157364, filed Nov. 12, 2014, the entire contents of which is incorporated herein for all purposes by this reference.

BACKGROUND OF THE INVENTION

Field of the Invention

The present invention relates to a transmission for a hybrid vehicle, and more particularly, to a transmission for a hybrid vehicle configured with a double clutch.

Description of Related Art

In general, a hybrid vehicle is a vehicle in which an engine using oil fuel and a motor using a battery as a power source are mounted together to increase fuel efficiency and decrease exhaust gas, thereby protecting an environment.

The hybrid vehicle according to the related art includes the engine generating power, a transmission in which the motor, an engine clutch, a differential gear, and the like are embedded to perform a shift, and wheels connected to the transmission.

The engine clutch is fastened to or released from the engine. In this case, the engine is connected to a hybrid starter and generator (hereinafter, referred to as HSG) by a belt, so as to be re-operated by the HSG at the time of a hybrid electric vehicle (HEV) mode.

The motor is embedded in the transmission, so as to assist power of the engine at the time of driving of the vehicle and serve to charge the battery at the time of a regenerative breaking. In this case, one side of the motor is connected to the engine clutch on the same shaft as a driving shaft of the engine and the other side thereof is connected to a mechanical oil pump.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a hybrid vehicle which minimizes a sense of torque isolation at the time of performing a shift to a high output driving even without using a high specification motor.

Various aspects of the present invention are directed to providing a transmission for a hybrid vehicle which reduces costs and decrease the number of parts by reducing the number of gears.

According to various aspects of the present invention, a transmission for a hybrid vehicle may include an input shaft configured to receive power from an engine, a motor configured to receive power from a battery so as to generate the power by a regeneration, an output shaft configured to receive the power from the input shaft and the motor, and an idle shaft configured to connect the output shaft and the motor so as to receive driving force from the motor or transfer regenerative force to the motor.

The transmission may further include a common gear and an idle synchro mechanism that connect the idle shaft and the output shaft.

The common gear may be configured to simultaneously perform functions of a reverse gear and an Electric Vehicle (EV) gear.

The idle synchro mechanism may be disposed between the engine and the idle shaft and configured to connect the engine and the idle shaft and disconnect the engine and the idle shaft.

The input shaft may include a first input shaft and a second input shaft disposed parallel to each other and selectively receiving the power from the engine.

The output shaft may include a first output shaft receiving the power from the first input shaft, and a second output shaft disposed in parallel to the first output shaft and receiving the power from a second input shaft.

The idle shaft transfers the driving force of the motor to the second output shaft at the time of an EV mode in which the vehicle is driven with electric energy.

The idle shaft may transfer the driving force of the motor to the second input shaft at the time of the EV mode, and the second input shaft may transfer the driving force obtained from the idle shaft to the second output shaft.

The idle shaft may transfer the power obtained from the second input shaft to the motor at a time of a regenerative mode inducing electricity generation of the motor.

The transmission may further include a reverse gear and an idle synchro mechanism that connect the idle shaft and the input shaft, in which the reverse gear may be commonly used with an EV gear, and the idle shaft may transfer the power through the reverse gear and the EV gear at the regenerative mode.

The transmission may further include a low speed EV gear and a high speed EV gear that connect the idle shaft and the second output shaft, in which the low speed EV gear is a common gear which is commonly used with a reverse gear.

The second output shaft may be configured to transfer a portion of the power applied to the second output shaft to the first output shaft so as to crank the engine in a case in which the engine is started during driving at an EV mode.

The idle shaft may be configured to receive the power of the first input shaft and transfer the power to the motor at an idle charging mode in which the regenerative force is supplied to the motor by driving force of the engine.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
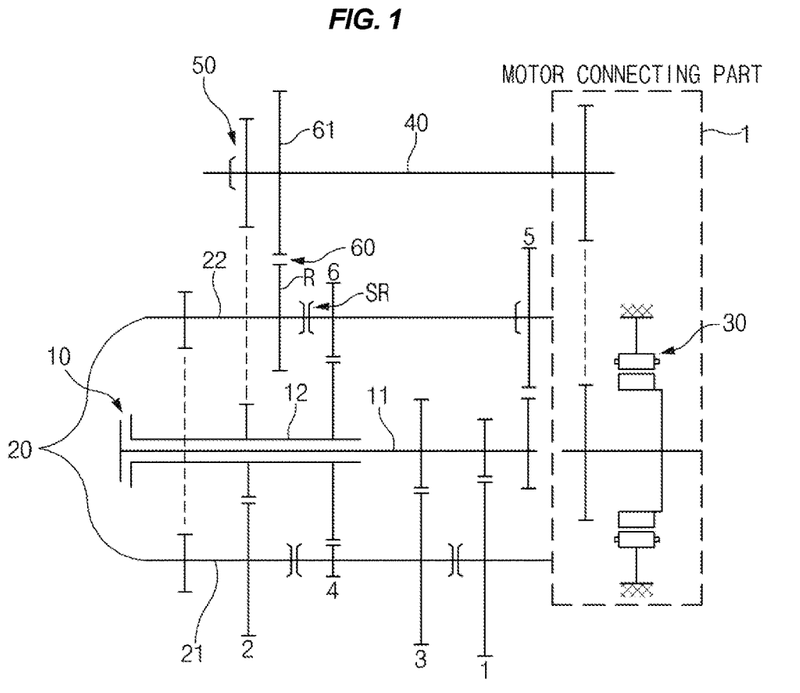
FIG. 1 is a configuration diagram of an exemplary transmission for a hybrid vehicle according to the present invention.

FIG. 1 is a configuration diagram of a transmission for a hybrid vehicle according to various embodiments of the present invention.

Referring to FIG. 1, a transmission for a hybrid vehicle according to various embodiments of the present invention includes an input shaft 10 receiving power from an engine, a motor 30 receiving the power from a battery so as to generate the power, and generating the power by regeneration, an output shaft 20 receiving the power from the input shaft 10 and the motor 30, and an idle shaft 40 connecting the output shaft 20 and the motor 30 so as to receive driving force from the motor 30 or transfer regenerative force to the motor 30. The motor 30 is disposed within the transmission and is connected to the idle shaft 40.

The transmission for the hybrid vehicle according to various embodiments of the present invention further includes a common gear set 60 and an idle synchro mechanism 50 connecting the idle shaft 40 and the output shaft 20.

In the transmission according to the present invention, a hybrid electric vehicle (HEV) transmission may be configured by adding a motor connecting part 1 and the idle synchro mechanism 50 to an existing DCT transmission. The common gear set 60 may comprise a first EV gear 61 mounted to the idle shaft 40 and a reverse gear R mounted to the second output shaft 22, where the first EV gear 61 is meshed with the reverse gear R. A synchronizer SR is positioned, on the second output shaft 22 and the synchronizer SR selectively connects the reverse gear R to the second output shaft 22. As seen in FIGS. 2, 3, 6, and 8, the reverse gear R is engaged with the second output shaft 22 by the synchronizer SR, therefore the driving force of the motor 30 is transmitted to the second output shaft 22. As seen in FIGS. 4, 7, 10, and 11, the reverse gear R is disengaged from the second output shaft 22 by the synchronizer SR, therefore the driving force of the motor 30 is not transmitted to the second output shaft 22. The idle synchro mechanism 50 is disposed between the engine and the idle shaft 40 so as to connect the engine and the idle shaft and disconnect the engine and the idle shaft.

The input shaft 10 includes a first input shaft 11 and a second input shaft 12 which are disposed so as to be in parallel to each other and selectively receive the power from the engine. The output shaft 20 includes a first output shaft 21 receiving the power from the first input shaft 11, and a second output shaft 22 which is disposed so as to be in parallel to the first output shaft 21 and receives the power from the second input shaft 12.

Figure 2:
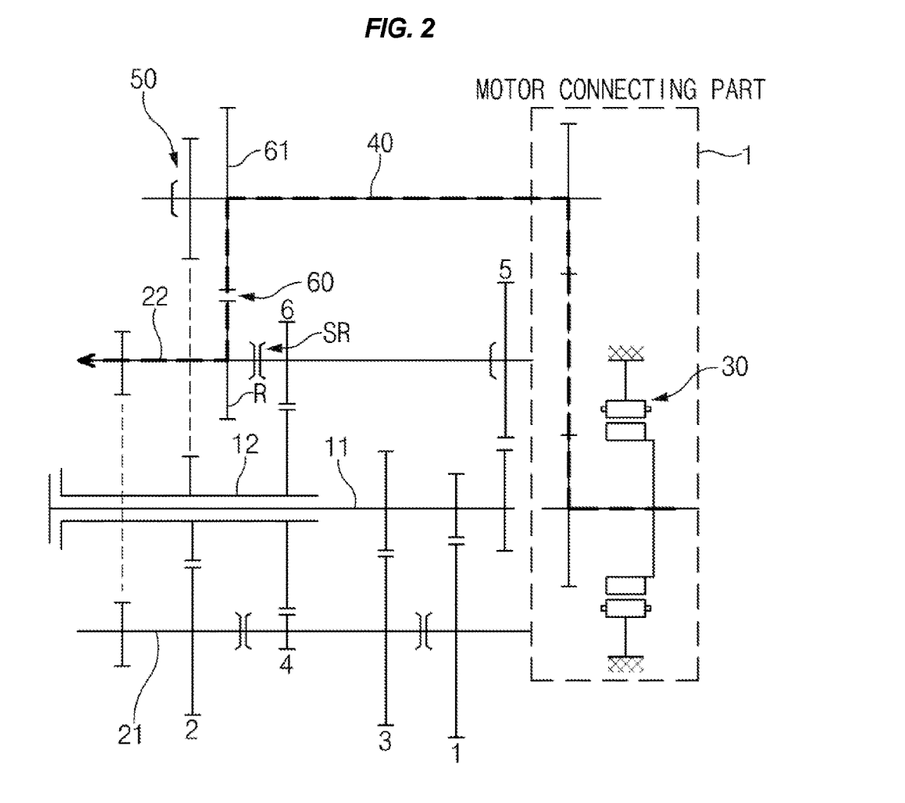
FIG. 2 illustrates a power transfer flow in FIG. 1 at a time of an EV mode.
Figure 3:
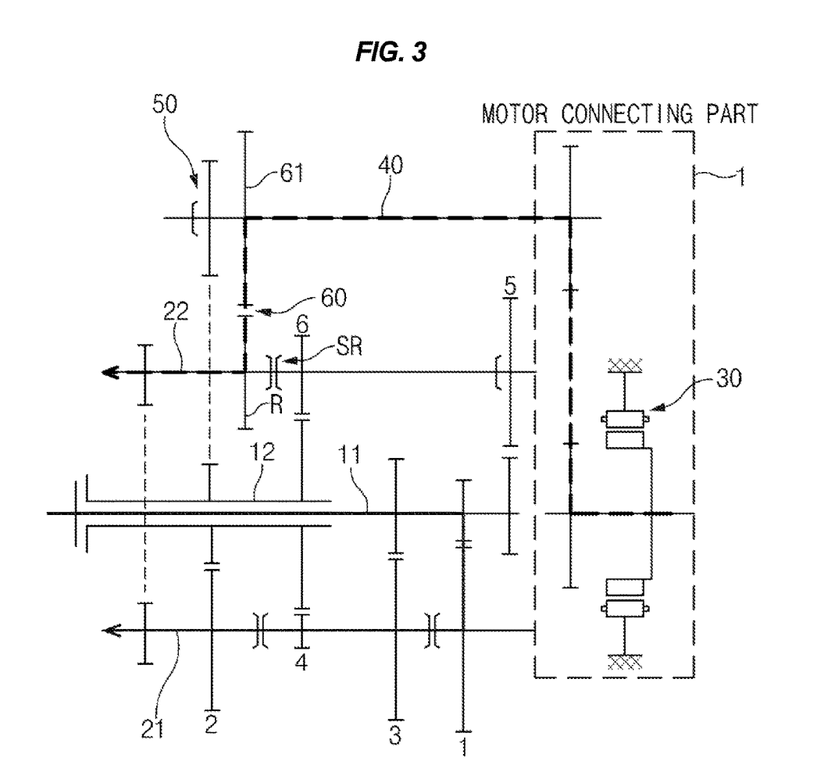
FIG. 3 illustrates a power transfer flow in FIG. 1 at a time of an HEV mode.
Figure 4:
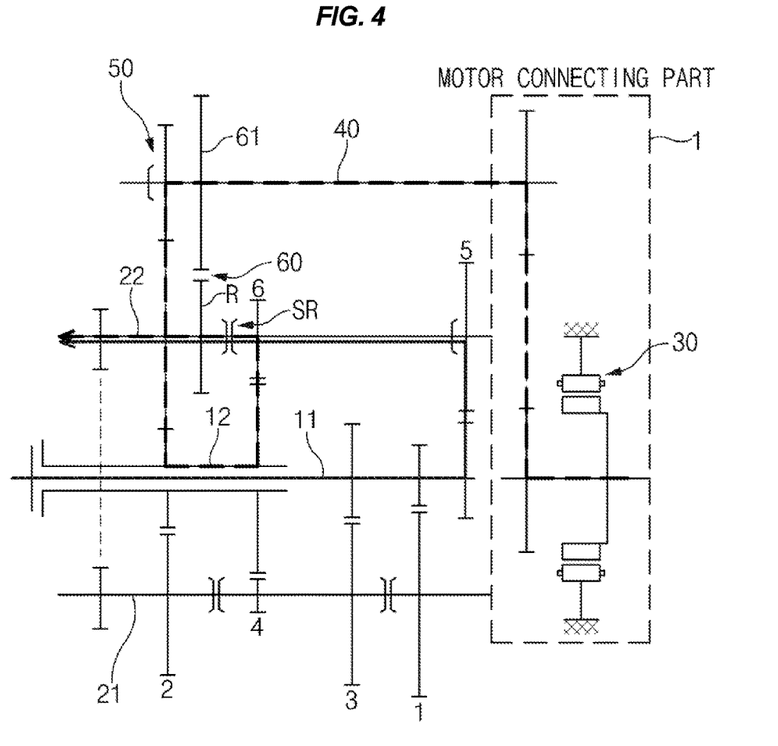
FIG. 4 illustrates a power transfer flow in FIG. 1 at a time of a high speed HEV mode.

FIG. 2 illustrates a power transfer flow in FIG. 1 at the time of an EV mode. FIG. 3 illustrates a power transfer flow in FIG. 1 at the time of an HEV mode. FIG. 4 illustrates a power transfer flow in FIG. 1 at the time of a high speed HEV mode.

Referring to FIG. 2 to FIG. 4, the idle shaft 40 transfers the driving force of the motor 30 to the second output shaft 22 at the time of the EV mode in which the vehicle is driven with electric force. Since the number of gear stages is increased at the time of a high speed driving, the output shaft 20 is changed from the first output shaft 21 to the second output shaft 22.

Figure 5:
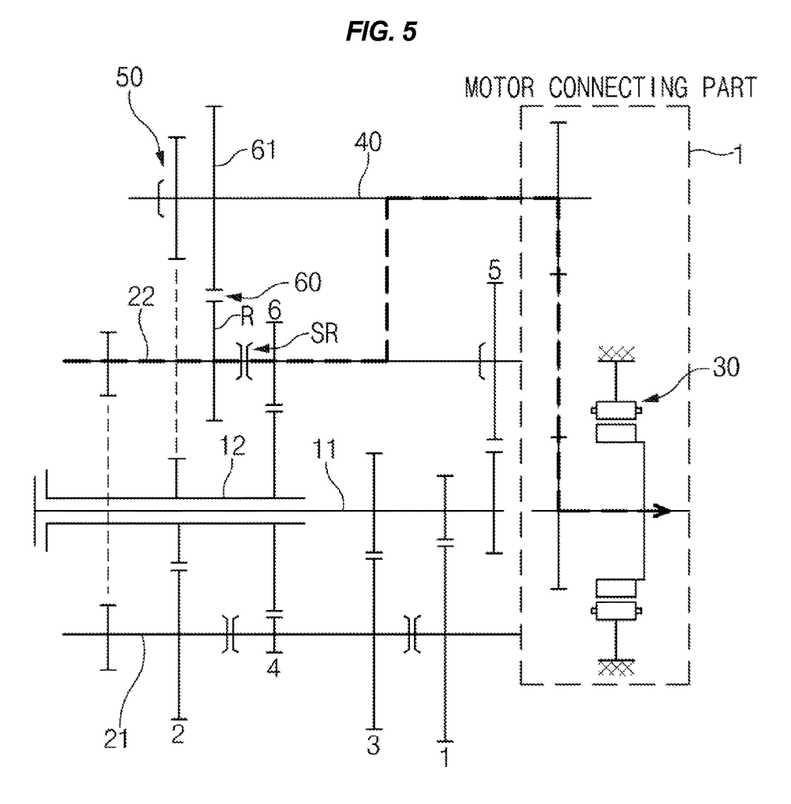
FIG. 5 illustrates a power transfer flow in FIG. 1 at a time of a regenerative mode.

FIG. 5 illustrates a power transfer flow in FIG. 1 at the time of a regenerative mode.

Referring to FIG. 5, the idle shaft 40 transfers the driving force of the motor 30 to the second input shaft 12 at the time of the EV mode, wherein the second input shaft 12 transfers the driving force obtained from the idle shaft 40 to the second output shaft 22.

The idle shaft 40 transfers the power obtained from the second input shaft 12 to the motor 30 at the time of the regenerative mode inducing electricity generation of the motor 30.

Another inventive features of the present invention will be explained hereinafter.

Figure 6:
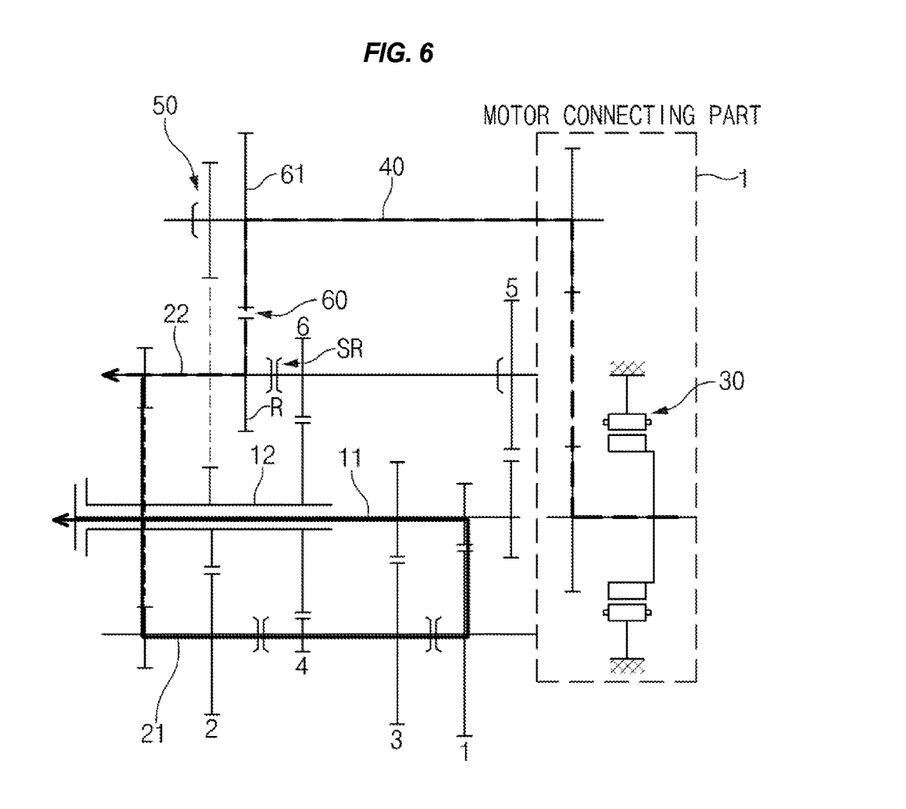
FIG. 6 illustrates a power transfer flow in FIG. 1 at a time of transforming mode from the EV mode to the HEV mode.

FIG. 6 illustrates a power transfer flow in FIG. 1 at the time of transforming the mode from the EV mode to the HEV mode.

Referring FIG. 6, in the case in which the engine is started during the driving at the EV mode, the second output shaft 22 transfers a portion of the power applied to the second output shaft 22 to the first output shaft 21, so as to crank the engine.

Figure 7:
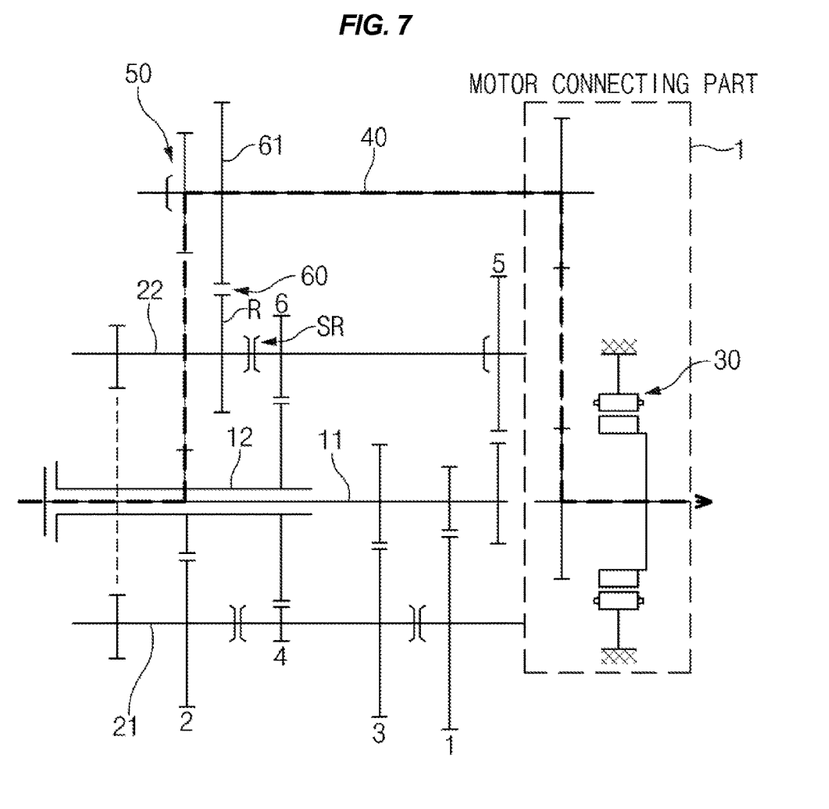
FIG. 7 illustrates a power transfer flow in FIG. 1 at a time of an idle charging mode.
Figure 8:
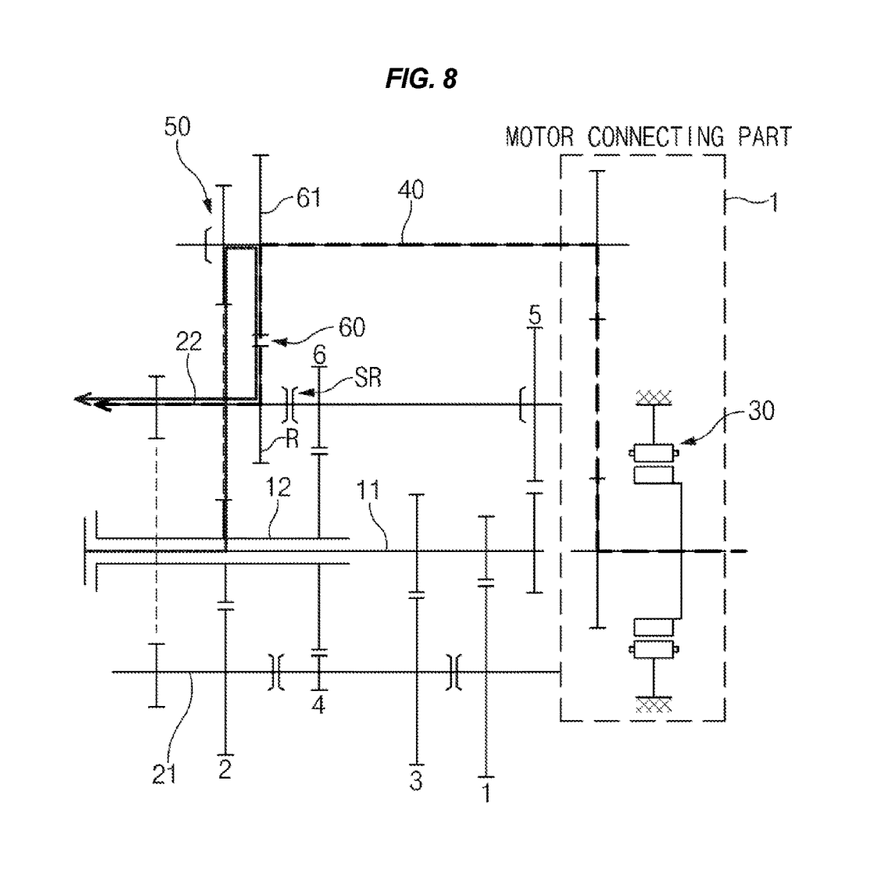
FIG. 8 illustrates a power transfer flow in FIG. 1 at a time of a reverse.

FIG. 7 illustrates a power transfer flow in FIG. 1 at the time of an idle charging mode. FIG. 8 illustrates a power transfer flow in FIG. 1 at the time of a reverse.

Referring to FIG. 7 and FIG. 8, the idle shaft 40 receives the power of the first input shaft 11 so as to transfer the power to the motor 30, at the time of an idle charging mode in which regenerative force is supplied to the motor 30 by the driving force of the engine.

Figure 9:
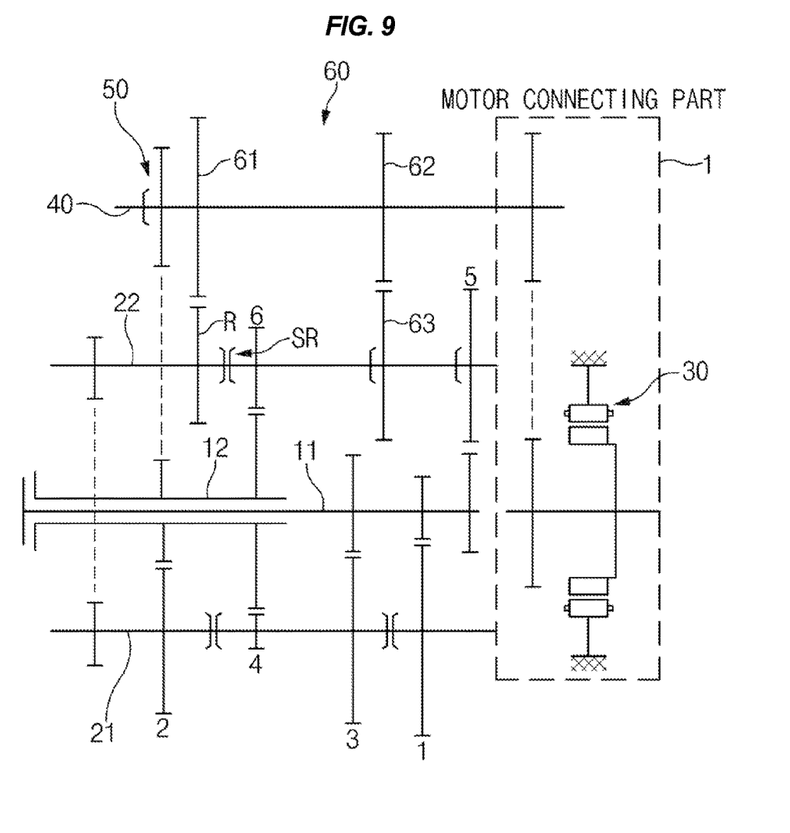
FIG. 9 is a configuration diagram of an exemplary transmission for a hybrid vehicle according to the present invention.
Figure 10:
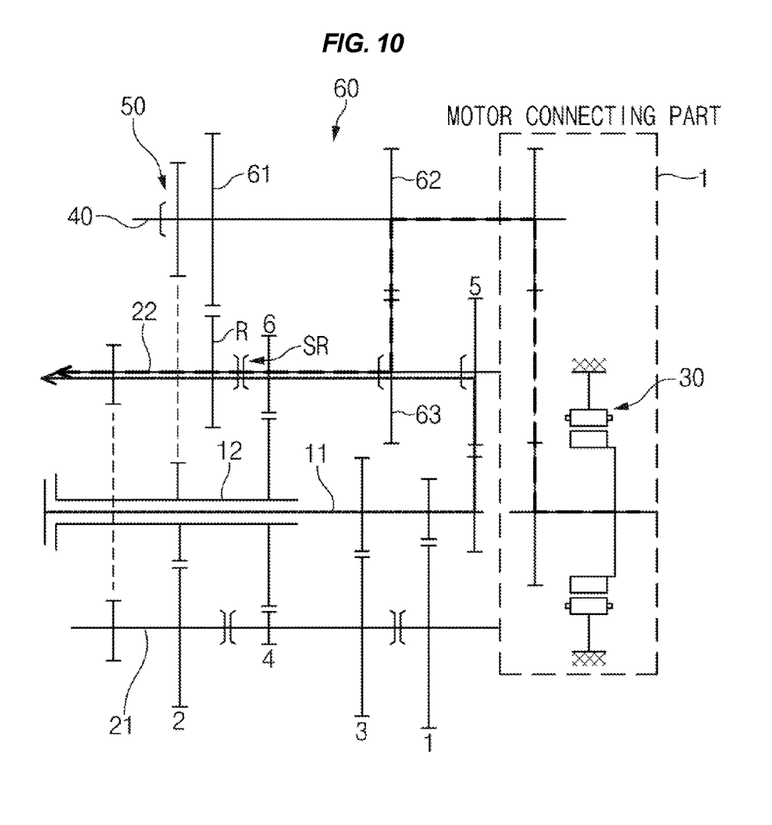
FIG. 10 illustrates a power transfer flow in FIG. 9 at a time of an HEV mode.
Figure 11:
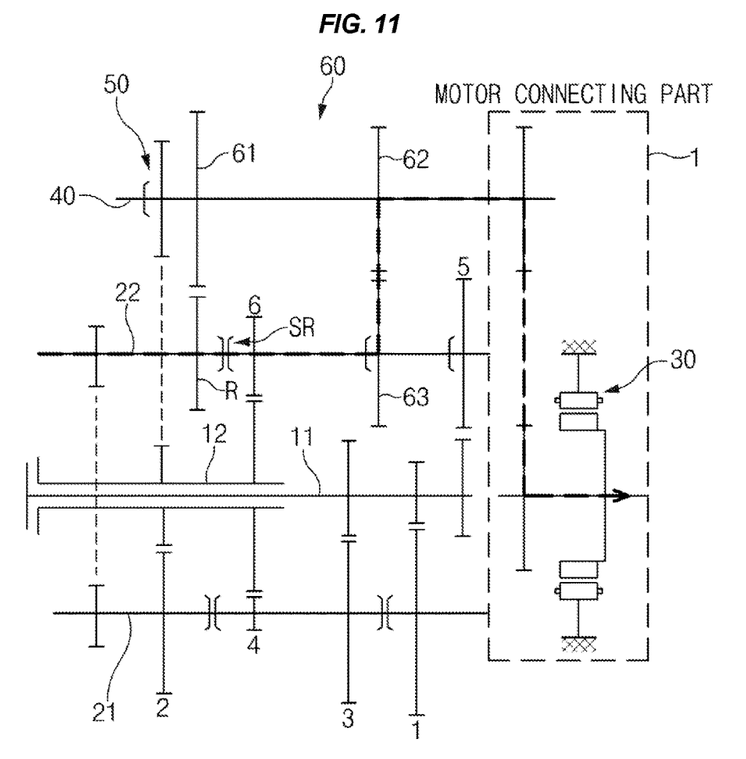
FIG. 11 illustrates a power transfer flow in FIG. 9 at a time of a regenerative mode.

FIG. 9 is a configuration diagram of a transmission for a hybrid vehicle according to various embodiments of the present invention. FIG. 10 illustrates a power transfer flow in FIG. 9 at the time of an HEV mode. FIG. 11 illustrates a power transfer flow in FIG. 9 at the time of a regenerative mode.

Referring to FIG. 9 to FIG. 11, the transmission for the hybrid vehicle according to various embodiments of the present invention further includes a second EV gear 62 mounted to the idle shaft 40 and a transfer gear 63 mounted to the second output shaft 22, wherein the second EV gear 62 is meshed with the transfer gear 63. According to the present invention, it is possible to minimize a sense of torque isolation at the time of performing a shift to a high speed driving and it is also possible to reduce the number of idle synchro mechanisms 50 as compared to the related art.

As described above, according to various embodiments of the present invention, the following advantages may be obtained.

First, it is possible to minimize a sense of torque isolation at the time of performing a shift to the high output driving even without using the high specification motor.

Second, it is possible to reduce costs and decrease the number of parts by reducing the number of gears.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a hybrid vehicle, the transmission comprising:
   first and second input shafts configured to receive power from an engine;
   a motor configured to receive power from a battery to generate the power by a regeneration;
   first and second output shafts configured to receive the power from the first and second input shafts and the motor;
   an idle shaft continuously engaged to the motor and configured to connect the second output shaft and the motor so as to receive driving force from the motor or transfer regenerative force to the motor; and
   a common gear set configured to connect the idle shaft and the second output shaft,
   wherein the common gear set comprises a first EV gear fixed to the idle shaft and a reverse gear selectively engaged with the second output shaft,
   wherein the first EV gear is meshed with the reverse gear,
   wherein a second EV gear is mounted to the idle shaft,
   wherein a transfer gear is mounted to the second output shaft,
   wherein the second EV gear is meshed with the transfer gear, and
   wherein an idle synchro mechanism is disposed between the engine and the idle shaft so as to connect the engine and the idle shaft or disconnect the engine and the idle shaft.

2. The transmission according to claim 1, further comprising the idle synchro mechanism that connects the idle shaft and the second output shaft.

3. The transmission according to claim 1, wherein the first input shaft and the second input shaft disposed parallel to each other and selectively receiving the power from the engine.

4. The transmission according to claim 1,
   wherein the first output shaft receives the power from the first input shaft; and
   wherein the second output shaft is disposed in parallel to the first output shaft and receives the power from a second input shaft.

5. The transmission according to claim 4, wherein the idle shaft transfers the driving force of the motor to the second output shaft at the time of an EV mode in which the vehicle is driven with electric energy.

6. The transmission according to claim 5,
   wherein the idle shaft transfers the driving force of the motor to the second input shaft at the time of the EV mode, and
   wherein the second input shaft transfers the driving force obtained from the idle shaft to the second output shaft.

7. The transmission according to claim 4, wherein the idle shaft transfers the power obtained from the second input shaft to the motor at a time of a regenerative mode inducing electricity generation of the motor.

8. The transmission according to claim 4, wherein the idle shaft is configured to receive the power of the first input shaft and transfer the power to the motor at an idle charging mode in which the regenerative force is supplied to the motor by driving force of the engine.

* * * * *